US009187188B2

(12) United States Patent
Richter et al.

(10) Patent No.: US 9,187,188 B2
(45) Date of Patent: Nov. 17, 2015

(54) ASSEMBLY INSPECTION SYSTEM AND METHOD

(71) Applicant: Premium AEROTEC GmbH, Augsburg (DE)

(72) Inventors: Ingo Richter, Oldenburg (DE); Michael Schomacker, Bremerhaven (DE); Sebastian Schwanzar, Oldenburg (DE); Daniel Garmann, Bremen (DE); Steffen Sauer, Magdeburg (DE); Erik Trostmann, Magdeburg (DE); Dirk Berndt, Magdeburg (DE)

(73) Assignee: PREMIUM AEROTEC GMBH, Augsburg (DE)

( * ) Notice: Subject to any disclaimer, the term of this patent is extended or adjusted under 35 U.S.C. 154(b) by 0 days.

(21) Appl. No.: 14/107,435

(22) Filed: Dec. 16, 2013

(65) Prior Publication Data

US 2015/0012171 A1 Jan. 8, 2015

Related U.S. Application Data

(60) Provisional application No. 61/842,031, filed on Jul. 2, 2013.

(51) Int. Cl.
*B64F 5/00* (2006.01)
*G06T 7/00* (2006.01)

(52) U.S. Cl.
CPC ............... *B64F 5/0045* (2013.01); *G06T 7/001* (2013.01); *G06T 2207/10012* (2013.01); *G06T 2207/30164* (2013.01)

(58) Field of Classification Search
CPC ... B60C 23/0408; B60C 23/061; B60T 8/172; B60T 8/885; B60T 2230/02
USPC .............................. 701/3, 13–14, 32.9, 36, 39
See application file for complete search history.

(56) References Cited

U.S. PATENT DOCUMENTS

| | | | |
|---|---|---|---|
| 5,910,894 A * | 6/1999 | Pryor | 700/95 |
| 6,163,946 A * | 12/2000 | Pryor | 29/407.04 |
| 6,167,607 B1 * | 1/2001 | Pryor | 29/407.04 |
| 6,496,755 B2 * | 12/2002 | Wallach et al. | 700/245 |
| 6,836,701 B2 * | 12/2004 | McKee | 700/245 |
| 8,370,030 B1 * | 2/2013 | Gurin | 701/49 |
| 2003/0052169 A1 * | 3/2003 | Tsikos et al. | 235/454 |
| 2003/0227470 A1 | 12/2003 | Genc et al. | |
| 2006/0238877 A1 * | 10/2006 | Ashkenazi et al. | 359/630 |
| 2010/0042269 A1 * | 2/2010 | Kokkeby et al. | 701/3 |
| 2012/0303336 A1 | 11/2012 | Becker et al. | |
| 2013/0018525 A1 * | 1/2013 | Jang et al. | 701/2 |
| 2013/0041508 A1 * | 2/2013 | Hu et al. | 700/259 |
| 2013/0261876 A1 * | 10/2013 | Froom et al. | 701/29.3 |
| 2015/0134274 A1 * | 5/2015 | Froom et al. | 702/39 |

* cited by examiner

*Primary Examiner* — Mary Cheung
*Assistant Examiner* — Atul Trivedi
(74) *Attorney, Agent, or Firm* — Leydig, Voit & Mayer, Ltd.

(57) ABSTRACT

A method for inspecting assembly of components in a structure includes acquiring a visual representation of at least a portion of the structure, and saving an electronic file of the visual representation on a computer readable medium. A three-dimensional design of the structure, which contains information on a proper position of the components within the structure, is accessed. The visual representation is compared with the three-dimensional design using a computer, and a feedback indicating a result of the comparison is generated.

22 Claims, 11 Drawing Sheets

Fig. 2

ASSEMBLY INSPECTION SYSTEM AND METHOD

CROSS-REFERENCE TO RELATED APPLICATIONS

This patent application claims the benefit of U.S. Provisional Patent Application No. 61/842,031, filed Jul. 2, 2013, which is incorporated herein in its entirety by this reference.

TECHNICAL FIELD

This patent disclosure relates generally to inspection systems and, more particularly, to automated assembly inspection systems and methods for aircraft structures.

BACKGROUND

When building aircraft structures by assembling and fastening components together according to a blueprint, plan or design, it is desirable to produce a structure that is as true as possible to the design. Such assembly accuracy can improve the fit and function of the structure. Component assembly accuracy, while desirable in most applications, is necessary for proper operation of structures operating under demanding conditions. For example, a large structure such as a commercial airliner may include millions of components and fasteners, each of which should be assembled in accordance with a specific design for the aircraft to perform as intended.

Relative to the described aircraft structure assembly processes, it is important not only to ensure that all components are assembled into the aircraft structure, but also that each assembled component is in the correct position. Depending on the type of component in the aircraft, minor deviations in component position may have a significant effect in the operation of the aircraft, or may alternatively have effects that are not immediately apparent but that are nevertheless important for the efficient operation of the aircraft.

Various inspection methods for assembly completeness and correctness of aircraft structures have successfully been used in the past. One example of a known inspection method can be found in US 2012/0303336 A1, which describes an arrangement for verifying a real model by using a virtual model. Another example can be found in US 2003/0227470 A1, which describes an augmented reality system in which the registration accuracy between a virtual environment and the real environment is measured. These and other similar systems rely heavily on manual operations in which an operator is tasked with spotting and recording issues uncovered by visual inspection. However, given the customary drawbacks of manual or visual inspection, especially in assemblies involving millions of components, the current methods of inspection cannot reliably provide infallible results. Moreover, because of the size and complexity of the assemblies and the number of components, highly complex checking is required, which is a time consuming, labor-intensive and expensive operation.

BRIEF SUMMARY OF THE DISCLOSURE

In one aspect, the disclosure describes a method for inspecting assembly of components in an aircraft structure. The method includes acquiring a visual representation of at least a portion of the aircraft structure and accessing a three-dimensional design of the structure, which contains information on a proper position of the components within the aircraft structure. The visual representation is compared with the three-dimensional design using a computer, and feedback is generated indicating the result of the comparison.

In another aspect, the disclosure describes a method for automatic inspection of a real aircraft structure against a computer aided design (CAD) model of the real aircraft structure. The method includes retrieving CAD data of the model. A checking plan that includes a plurality of inspection stations, and a robot plan for a robot carrying a sensor array disposed to acquire visual information from the real aircraft structure are generated. The robot plan includes a plurality of positions, each of which corresponds to a particular inspection station. The robot plan is provided to a robot controller, and the checking plan is provided to a data processing unit. The robot plan is executed to obtain visual information from the real aircraft structure. The visual information is compared with the CAD data at each inspection station to generate an output indicative of component deviations when the comparison of the visual information with the CAD data indicates that a component of the real aircraft structure has at least one of an incorrect position, incorrect shape, or is not present on the real aircraft structure.

In yet another aspect, the disclosure describes an inspection system adapted to inspect a real aircraft structure, which has a plurality of components therein. In one embodiment, the inspection system includes a non-transitory, computer-readable database containing computer readable information therein indicative of a design of the real aircraft structure. An image capturing device is configured to capture visual information from the real aircraft structure. A conveyance device is configured to selectively carry and position the sensor array relative to the real aircraft structure. A controller associated with the database, the sensor array, and the conveyance device, is disposed to compare the visual information to the information indicative of the design.

DETAILED DESCRIPTION

Figure 1:
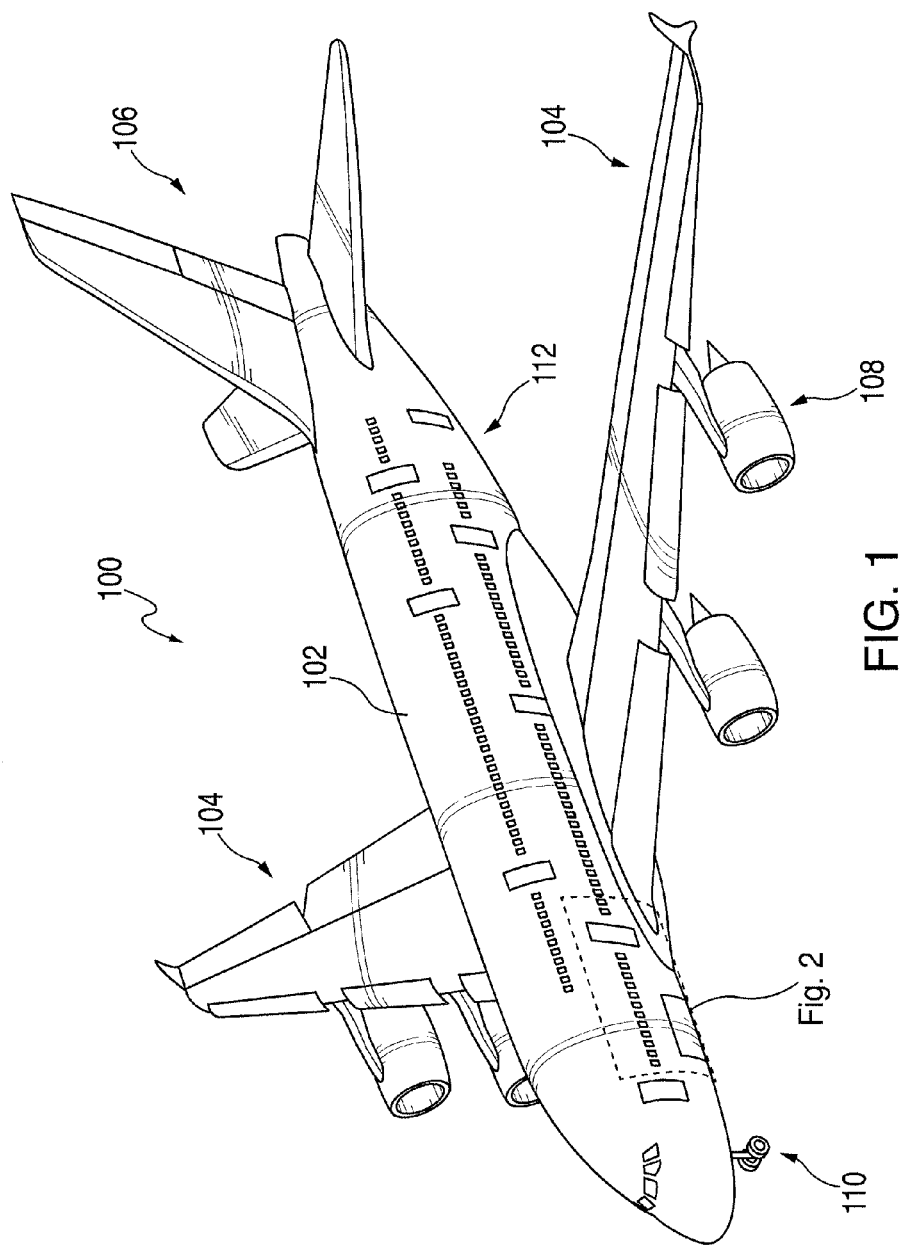
FIG. 1 is a partial cutaway of an aircraft assembly in accordance with the disclosure.

This disclosure relates to assembly completeness and correctness of multiple components into assemblies and, more specifically, to an automated assembly system and method for automatically determining the completeness and correctness of placement of fasteners and other components in an assembly of components. In the particular embodiment disclosed, the inspection system is used in the context of inspection of aircraft structures, because such structures typically include a large number of components and fasteners assembled into larger structures.

In one disclosed embodiment, a system acquires and analyzes a visual representation of an assembled aircraft structure. The system is further equipped with the corresponding design information for the assembled structure, for example, by accessing three-dimensional designs of the structure that contain all components and the proper position of those components with respect to a datum surface, line and/or point of the structure. The inspection system is configured to automatically and visually or graphically compare information acquired from the real structure with corresponding design information to determine whether all components have been assembled in the real structure in the correct position and orientation. The system is further configured to determine whether resulting features of the structure, such as openings, holes, surface profiles and other structural attributes of the assembled structure are within design parameters. To accomplish these tasks, two modes of visual information processing are employed. In one embodiment, the position and dimensions of openings, holes and relatively flat or standard-shaped components such as fasteners are determined by acquisition and analysis of two-dimensional images, which are analyzed by use of filters and other techniques to determine the presence and location of components in the assembly. For relatively larger and more complex objects and components such as brackets, clips and cleats, three-dimensional images are taken and analyzed to determine the correct shape and location of these components.

When aspects of the real structure are determined to be complete and accurate, the system creates and stores a visual representation identifying the attribute checked and indicated that the particular attribute passed the inspection. Similarly, when assembly or material faults are found to be present in the real structure as a result of the analysis, the system is configured to create and store a visual representation identifying the fault and indicating that the particular attribute failed the inspection. In one embodiment, the system is further configured to classify or otherwise associate various fault conditions with one another such that, when one fault condition is found, related fault conditions are also identified. The system may be further configured to create a physical representation on the assembled structure, for example, by depositing a paint dot or an ink imprint, which can be used to quickly and visually confirm a fault report generated by the system by visual confirmation on the assembled structure.

As was previously done in augmented reality inspection systems, such as those mentioned above, various component positioning faults can be viewed and compared both in reality and, by way of comparison, in the CAD model from the same angle of view. In contrast with known systems, however, which depended on a human operator's determination of the presence of a fault, the disclosed systems and methods are configured to analyze the visual information acquired and to perform comparisons between derived visual information from the assembled structure and the three-dimensional design model for that structure in an automatic fashion that does not require user input. In this fashion, a human operator can be presented with a list of any faults identified by the system such that a more thorough inspection of those identified areas can be carried out.

Exemplary fault conditions that can be identified by the systems and methods described herein can include determinations of whether holes and/or other openings are properly located on various parts of the assembly. For example, a hole can include a fastener opening formed in a structure, or may alternatively include an opening remaining after various components such as skin panels are assembled around a door or window opening in an aircraft fuselage. Other faults can include checking that a various brackets and other components are present in the assembly and, further, whether they have the correct size, shape, orientation and position as installed in the assembly structure.

A particular embodiment of the invention will now be described to illustrate various aspects thereof in relation to an inspection device and associated method pertaining to an aircraft structure. Accordingly, an aircraft structure 100 is shown in FIG. 1 in partial breakaway view. The aircraft structure 100 includes a fuselage 102, wing structures 104, a tail structure 106, engines 108, landing gear 110 (the nose gear is only visible), internal floor structures 112 that include furnishings and other systems, and the like, as is known. It can be appreciated that proper positioning of the various structural elements is required for proper fit and function of the various systems of the aircraft. When the aircraft structure 100 is assembled, it is made up of sub-assemblies that are fit together into a larger structure. Because the various sub-assemblies are put together individually, it must be ensured that the structures that make up the sub-assemblies, the connection features between the various sub-assemblies, and the various other structures for pass-through systems are dimensionally and positionally correct with respect to the aircraft structure 100 overall.

Figure 2:
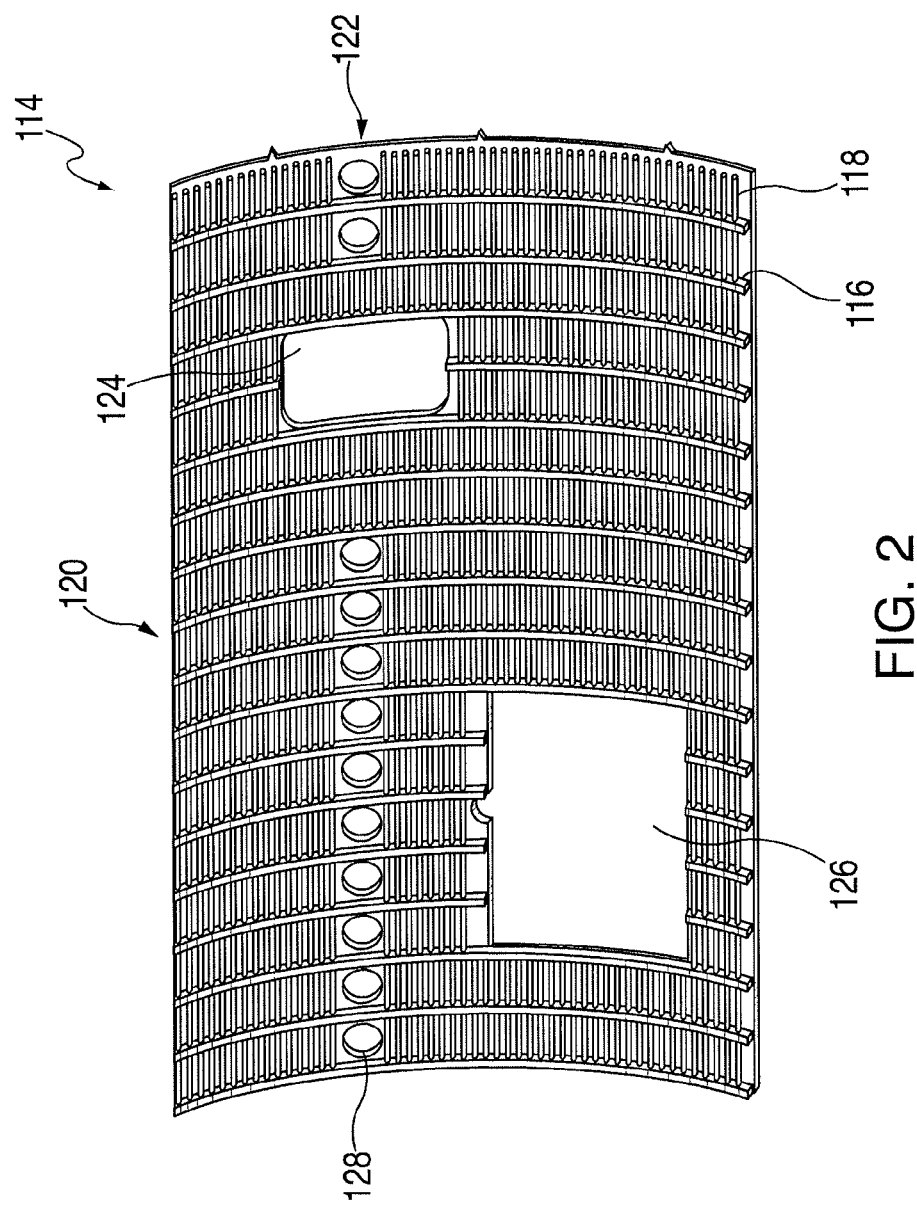
FIG. 2 is a view of a portion of an aircraft fuselage in accordance with the disclosure.

A sample sub-assembly 114 is shown in FIG. 2 separated from the aircraft structure 100 for illustration. The sub-assembly 114 includes various bulkheads or formers 116 and stringers 118 that form a skeleton structure 120, and a skin 122 that is connected to the skeleton structure 120 that, together, form a section of the fuselage 102 (FIG. 1). The sub-assembly 114 further forms various openings, for example, a cabin door opening 124, cargo door opening 126, cabin window openings 128 and other service openings. During manufacture of the sub-assembly 114 or, alternatively or additionally, upon completion of the sub-assembly 114, the absolute positioning of the various components and features such as openings of the sub-assembly 114 may be inspected for proper dimensioning and/or positioning with respect to a datum or coordinate system both with respect to the sub-assembly 114 as well as with respect to the aircraft structure 100 (FIG. 1). In the disclosed inventive exemplary embodiment, such positional and dimensional inspection can be carried out automatically by use of the inspection system 200, certain components of which are shown in FIG. 3 in a service environment.

Figure 3:
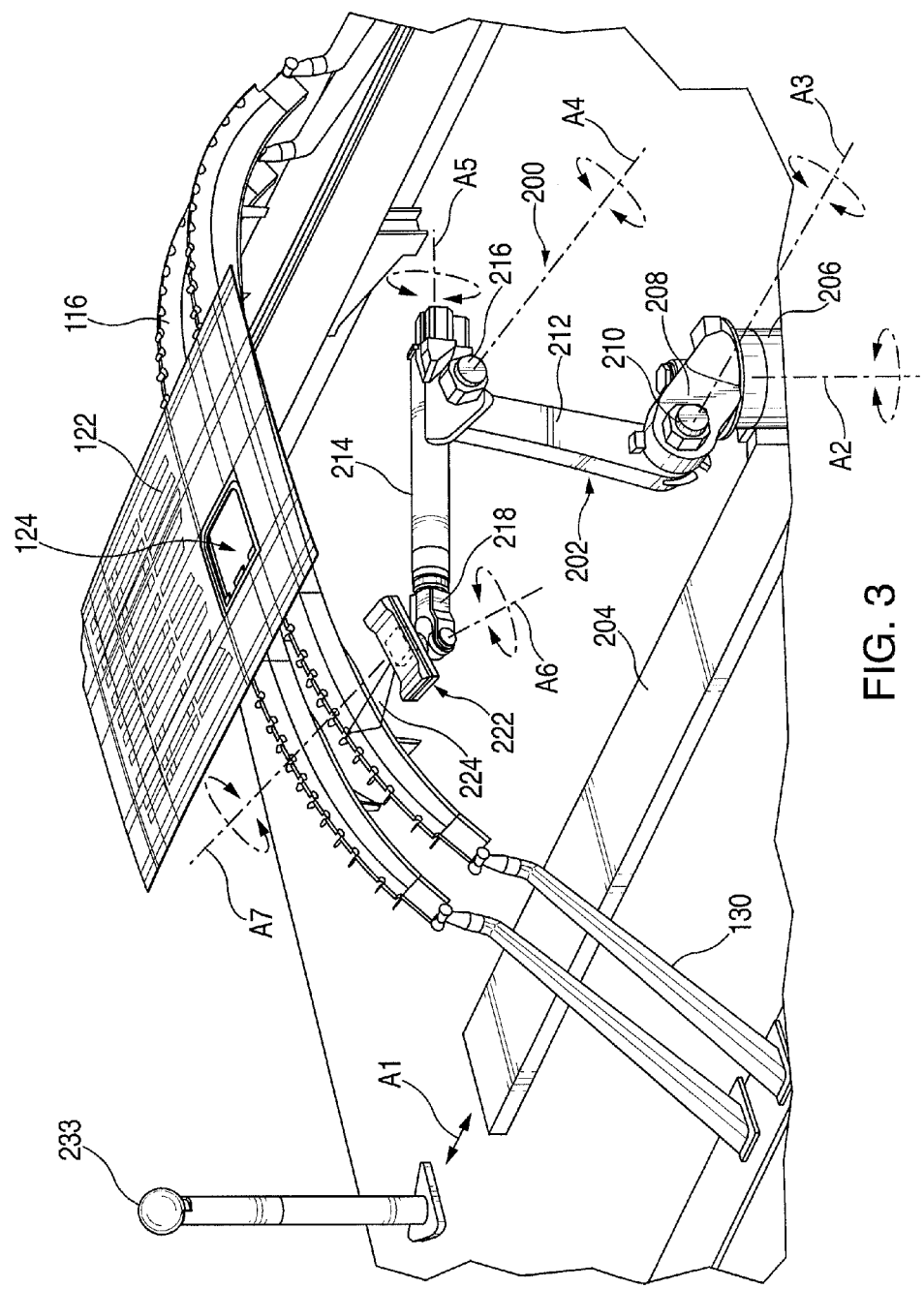
FIG. 3 is a perspective view of an inspection system in operation below an aircraft structure in accordance with the disclosure.

In reference now to FIG. 3, a still uncompleted section of the sub-assembly 114 is shown mounted onto an assembly or inspection jig 130 in a position and orientation making it accessible for inspection by the inspection system 200. The inspection system 200 in the illustrated embodiment includes a 7-axis robot 202 moveably mounted onto a base rail 204. The robot 202 includes a base portion 206 that is selectively moveable along the base rail 204 by action of a drive system (not shown) that is responsive to controller commands along an axis, A1. A shoulder portion 208 is selectively rotatable and connected to the base portion 206 and includes a pin joint 210 on a free end thereof onto which an upper arm portion 212 is connected. The shoulder portion 208 is rotatable with respect to the base portion 206 about a generally vertical axis, A2, which can alternatively be oriented differently. The upper arm portion 212 is rotatable relative to the shoulder portion 208 about the pin joint 210 with respect to a generally horizontal axis, A3.

The robot 202 further includes a lower arm portion 214 that is connected to a free end of the upper arm portion 212 at an elbow joint 216. The lower arm portion 214 includes an extending portion 218. Actuators are associated with the elbow joint 216 to enable pivotal motion of the lower arm portion 214 with respect to the upper arm portion 212 about an axis, A4, telescoping extension of the extending portion 218 with respect to the lower arm portion 214, and rotation of the extending portion 218 with respect to the lower arm portion 214 about an axis, A5.

The robot 202 further includes a wrist joint connected at a free end of the extending portion 218. The wrist joint supports and carries a sensor assembly 222 connected thereon that, by aid of the wrist joint 220, is configured to be selectively rotatable with respect to the extending portion 218 about two perpendicular axes, A6 and A7. In this way, the sensor assembly 222 can be moved with seven degrees of freedom with respect to the sub-assembly 114 to gain a line-of-sight view 224 of all areas thereof during inspection. Positioning and orientation of the sensor assembly 222 with respect to the sub-assembly 114 undergoing inspection is accomplished by the selective activation of rotation and translation of the various portions of the robot 202 in response to controller commands, which position the sensor assembly 222 over areas and in perspectives that render various features and dimensions of the sub-assembly 114 visible to the sensor assembly 222.

Figure 4:
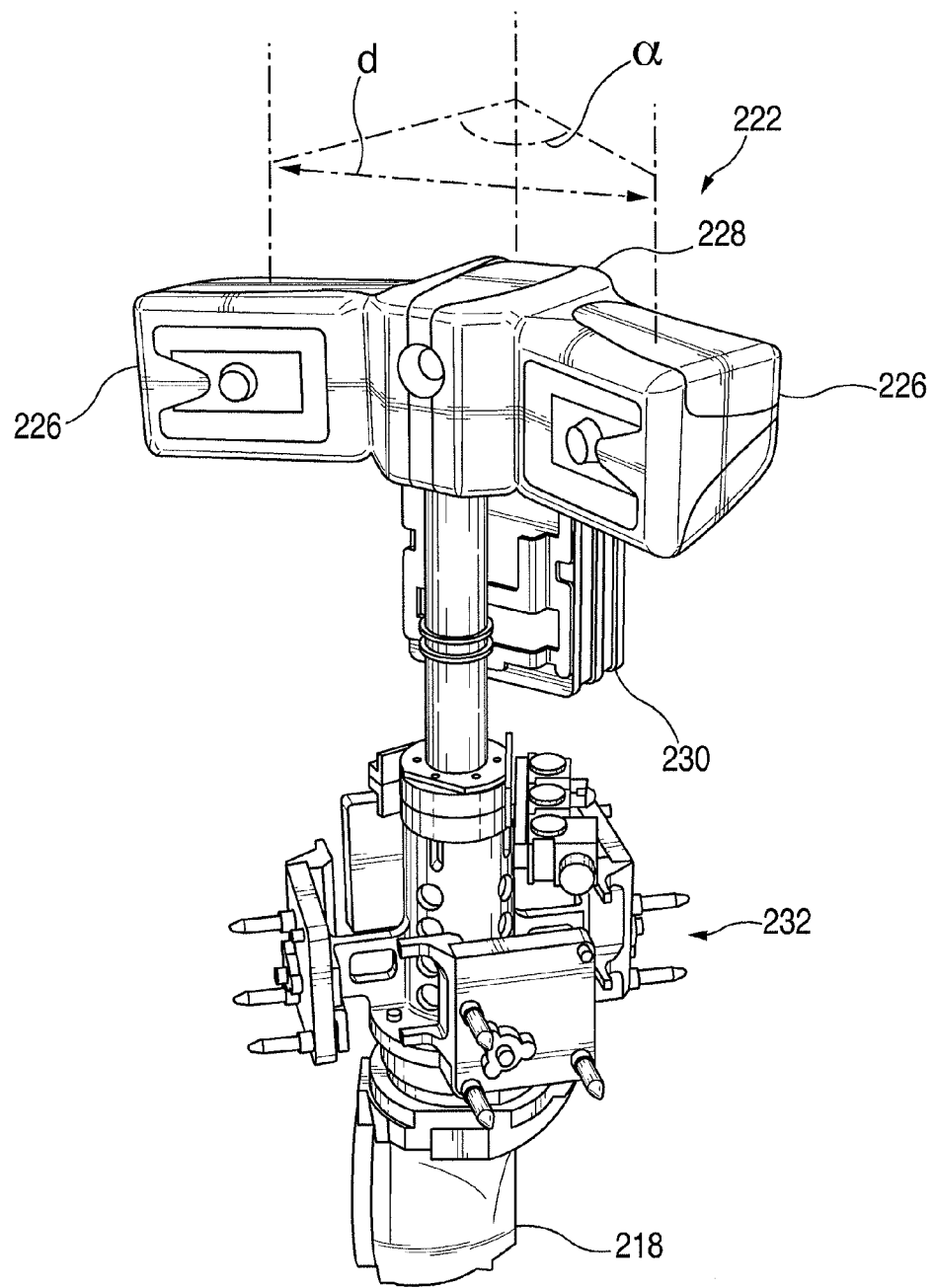
FIG. 4 is a close-up view of an inspection head in accordance with the disclosure.

A view of the sensor assembly 222 is shown in FIG. 4 to illustrate the various components thereof in accordance with a disclosed embodiment. The sensor assembly 222 can include any type of optical sensor or sensors arranged to capture images and 3D data. For example, the optical sensor(s) in the sensor array 222 can include any optical sensor that can capture 3D data such as point clouds and/or camera images. In the illustrated, exemplary embodiment, the sensor assembly 222 includes two self-illuminated cameras 226, for example, charged-couple device (CCD) cameras. The cameras 226 are disposed at a distance, d, and at an angle, a, relative to one another to together provide a three-dimensional perspective view of objects. Additionally, each camera 226 can acquire two-dimensional pictures of the structure. A structured light projector 228 is disposed between the cameras 226 and arranged to provide a lit pattern onto objects disposed within the viewing angle of the cameras 226. A data processing unit 230 is associated with the cameras 226 and light projector 228.

To provide spatial information indicative of the position, orientation and motion of the sensor assembly 222 in three-dimensional space to the controller (not shown) of the inspection system 200, an array of tracker targets 232 is mounted onto the end of the extender portion 218. The tracker targets 232 are sensed by a positional sensor 233, for example, a laser tracker, such that the position, orientation, speed, and/or trajectory of the sensor assembly 222 with respect to the sensor 233 can be determined. Signals indicative of this information are relayed to the controller, which correlates the position of the positional sensor 233 with respect to the objects being inspected such that the controller, at all times, can track the position of the sensor assembly 222 with the structures scanned by the sensor assembly 222. In the illustrated embodiment, the robot is a KUKA® industrial robot and the tracker targets are "T frame" laser tracker targets manufactured by Leica®. During operation, the structured light projector 228 provides a projected, stripe-pattern sequence of illuminated bands 234 onto a surface of the sub-assembly 114, as shown in FIG. 4, which is acquired and analyzed by the cameras 226.

Figure 5:
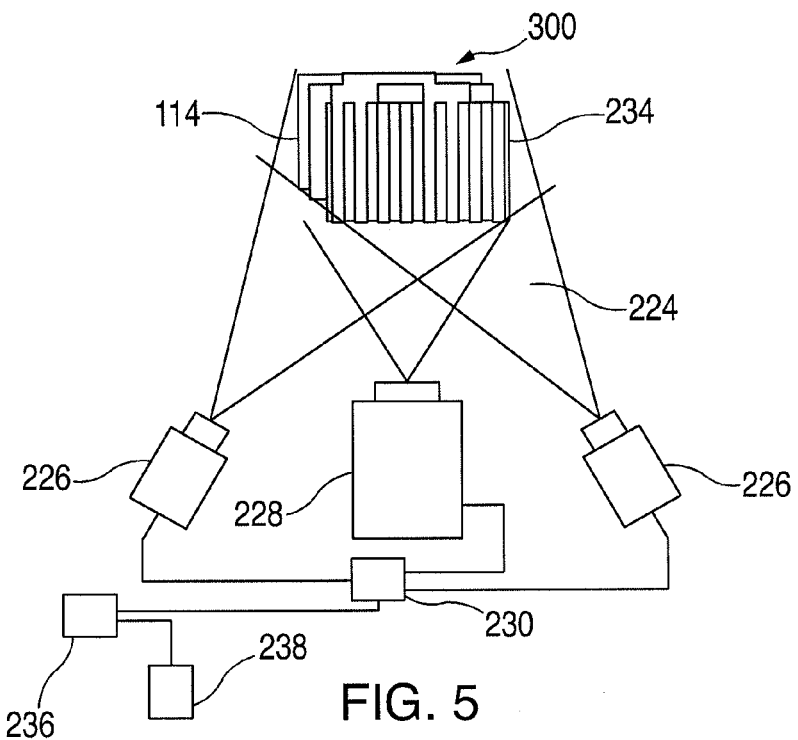
FIG. 5 is a schematic view of an inspection arrangement in accordance with the disclosure.

A block diagram of a portion of the inspection system 200 relative to the cameras 226 is shown in FIG. 5. In the illustrated embodiment, the illuminated bands 234 are visible onto an illuminated portion of the sub-assembly 114 that is undergoing inspection. The illuminated bands 234 are within the line of sight 224 of both cameras 226, which acquire a stereoscopic representation of the portion of the sub-assembly 114 and provide visual information indicative of the image they acquired to the data processing unit 230. The data processing unit 230 is connected with the cameras 226 and projector 228, receives the visual information provided by the cameras 226, and relays the information thus received to the controller 236. The controller 236 sends positional commands to the robot 202, as previously described, and receives feedback information therefrom indicative of the true position and orientation of the sensor assembly 222, which includes the cameras 226, such that the cameral information can be correlated with a true position of the portion of the sub-assembly 114 being inspected.

Figure 6:
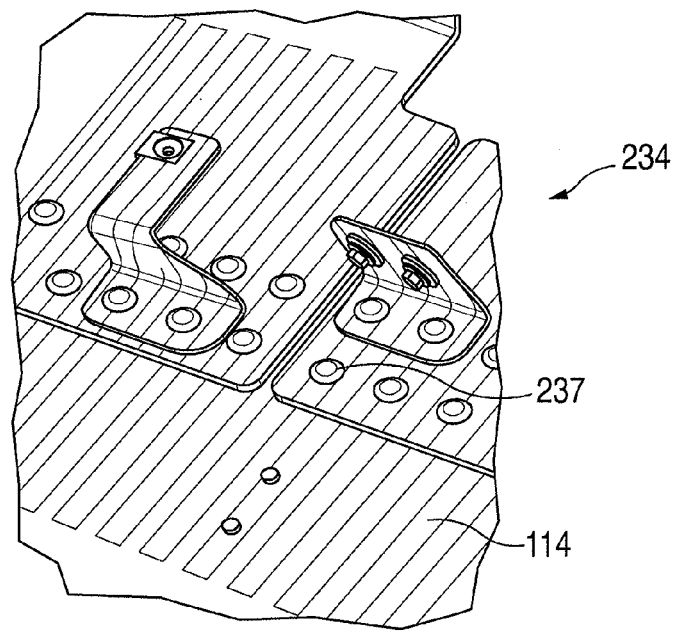
FIG. 6 is a portion of an aircraft structure during inspection in accordance with the disclosure.

An exemplary representation of a portion of the sub-assembly being illuminated by the illuminated bands 234 is shown in FIG. 6. Here, light and dark bands are used by the system to more reliably discern edges and the shape of assembled components in three-dimensional images. Two dimensional images can also be acquired, with or without the light and dark bands, and analyzed to discern edges of components and holes, the size of openings and other features. It should be appreciated that although the lit and shaded bands appear to have substantially the same width, other or different widths may be used. Moreover, the width of the various lit and shaded bands can be appropriately selected to provide sufficient resolution for detecting all relevant edges. In the illustrated embodiment, for example, the width of the bands is less than a head diameter of fasteners 237 such that the presence and position of a fastener 237 can be reliably detected. As can be appreciated, use of smaller or larger fasteners and the size of other components may require a finer resolution, which can be achieved by configuring the bands of light and dark areas to be narrowed than what is shown in FIG. 4.

Figure 8:
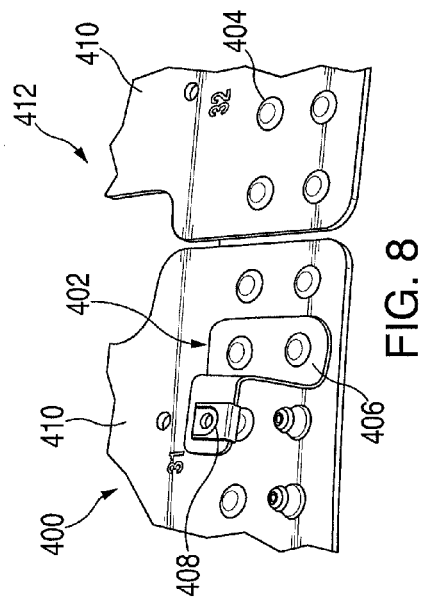
FIGS. 7-10 are representations of an aircraft structure from different perspectives and sources in accordance with the disclosure.
Figure 7:
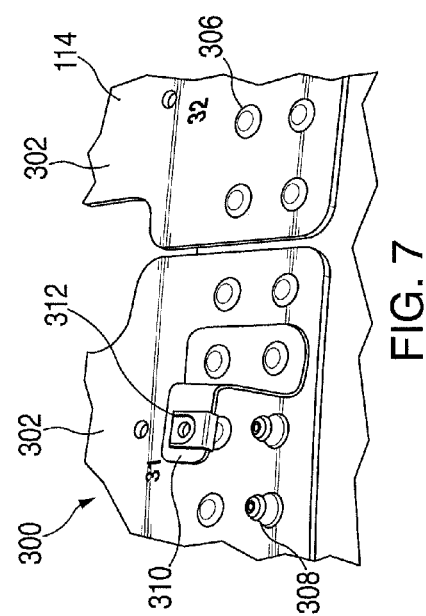

The images acquired from the cameras 226 under the structured illumination provided by the projector 228 or, in general, the images captured by the sensor assembly 222, are analyzed in the controller 236 to detect the shape of assembled components and provide a line-view, three-dimensional representation of the area being scanned. A sample representation of a first type of analysis using two-dimensional images is shown in FIGS. 7 and 8, where FIG. 7 represents a two-dimensional picture, without structured light bands, of a scanned area 300 of the sub-assembly 114 that includes two skin plates 302 connected to a base component by rivets 306 and studs 308. Also shown is a Z-bracket 310 having a clip 312 and being connected to the base component through one of the skin plates 302 by rivets 306, which may be different or the same as the rivets used to connect the skin plates to the base component.

When scanning the area 300, the projector 228 may first produce the illuminated bands 234 thereon, as shown and discussed relative to FIG. 5 above, or may alternatively use diffuse lighting from the environment to acquire the two-dimensional image. After visual information relative to the area 300 is acquired by the sensor assembly 222 and relayed to the controller 236, the controller may process the visual information to create a line-view, two-dimensional representation 400, as shown in FIG. 8, by graphically analyzing the visual information to create edges 402 of the various components seen by the sensor assembly 222. The graphical analysis may further include de-noise and filtering operations to remove extraneous visual information, aliasing and shadows. After the image has been processed, edges indicative of the presence and position of the rivets 404, of the bracket 406, of the clip 408, and of the general shape of the skin plates 410 may be created or generated and saved as a scan illustration 412 for comparison with design information.

Figure 10:
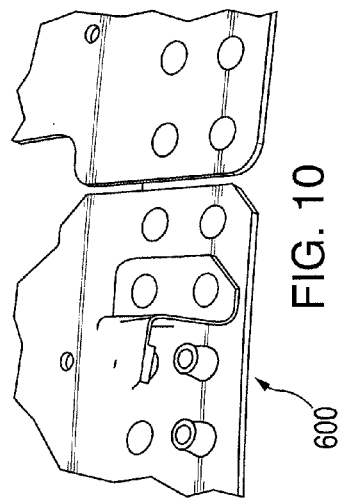
Figure 9:
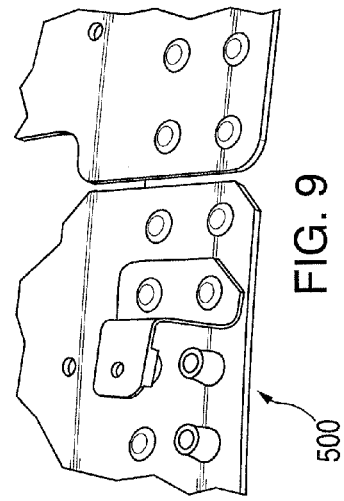

Design information, and the processing thereof performed by controller 236 or a different controller associated with the inspection system 200 is shown in FIGS. 9 and 10. In FIG. 9, a view of an area 500 generated by a three dimensional computer aided design (CAD) model of the sub-assembly 114 is considered by the inspection system. The view of the area 500, which corresponds to the area 300, is configured to have the same or substantially similar scaling, size, viewing angle and perspective with the view seen by the sensor assembly 222 on the real structures, such that a compatible comparison can be made. As shown, the view of the area 500 from the CAD model includes the same rivets, skin plates, bracket and clip that are to be found on the area 300. The controller may acquire and process a two-dimensional image of the area 500 to create an line-edge view 600 thereof, which is shown in FIG. 10, in a fashion similar to the processing of the image of the area 300 to create the representation 400.

As can be seen from FIG. 10, the particular color and lighting scheme of the CAD model may prevent the system from distinguishing all edges of the area 500. Nevertheless, such effects will not prevent proper analysis as long as a sufficient percentage of available edges for any given component are detected. In one embodiment, the controller 236 is configured to generate edge-representations of both the real components scanned by the sensor assembly 222 and the CAD models corresponding to those components in real time. Alignment and orientation of the CAD model perspective with respect to the viewing angle and position of the sensor assembly 222, for example, the cameras 226, or vice versa, occurs continuously and in real time by appropriate positioning of the sensor assembly 222 by the robot 202. When the edge-representation images created from the real structures that are inspected and from the CAD model, the controller is able to discern any differences and flag those differences as inspection fault for follow inspection by humans to either confirm or clear the faults. Pictures representative of fault and non-fault conditions that can be detected by the system 200 are shown in FIGS. 11-14.

Figure 11:
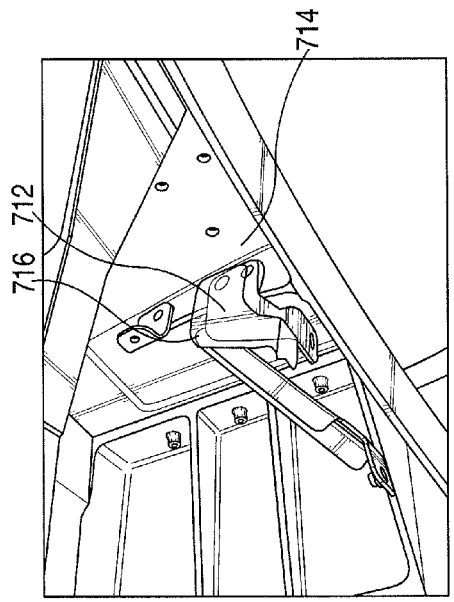
FIGS. 11-14 are representations of various aircraft structures during inspection in accordance with the disclosure.
Figure 13:
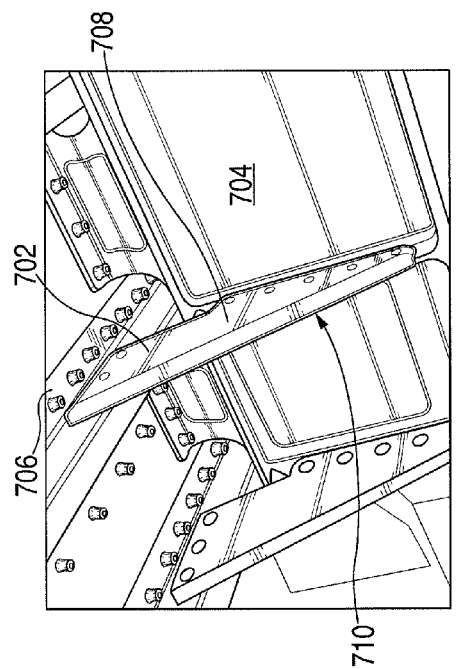

More specifically, FIG. 11 shows a portion of sub-assembly 114 after it has been assembled into the aircraft structure 100 and additional bracing components have been installed. In FIG. 11, a brace 702 is connected between first and second fuselage components 704 and 706. In FIG. 13, the same components can be seen but from a different perspective. The illustrations in FIGS. 11 and 13 represent a three-dimensional image of the real structures with an illustration of the brace 702 taken from the CAD system superimposed thereon. The superimposition of the shape, size and location of the brace 702 between the first and second fuselage components 704 and 706 is carried out by generation of edge-representations and superimposition of those representations to align the two representations in a three-dimensional space. Superimposition is accomplished by aligning as many edges as possible between the two representations. In one embodiment, only those edges that appear to be in the correct position are used.

Figure 12:
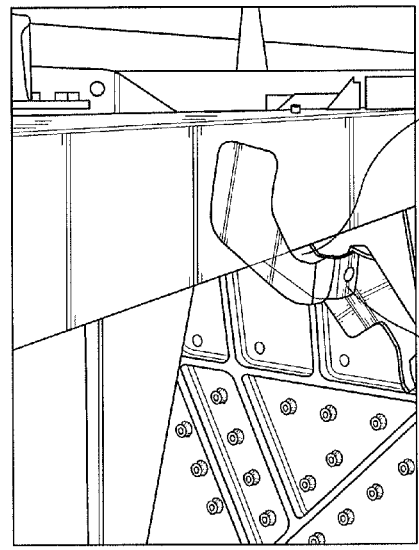
Figure 14:
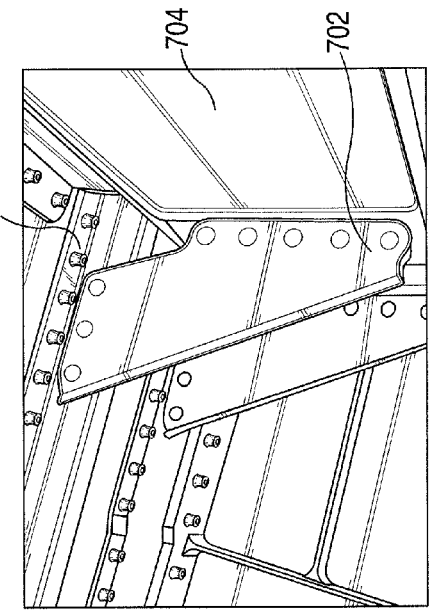

The illustrations in FIGS. 11 and 13 are the properly superimposed representations with shading and image information added to ease review of the information presented by human operators of the system. When the position, shape, location and other structural aspects of the brace 702 are within acceptable parameters, e.g. when the component being inspected is installed in the correct position in the correct fashion, a shaded shape corresponding to the shape of the component is created on a vision device such as a screen. In the illustrated embodiment, a shaded area 708 is shown covering the brace 702. The shaded area 708 is bound by an outline 710 of the brace 702 indicating where the correct position is and indicating that the brace 702 is in the correct position. An analogous situation that contains a fault position is shown in FIGS. 12 and 14. Here, a bracket 712 is installed into a structure 714. As shown from different perspectives in these figures, a shaded area 716 denotes the correct location for the bracket 712, but the bracket is lower than the correct position such that the shape of the bracket does not align fully with the shaded area 716. In this way, a fault can be demonstrated. To ease review by an inspector, the shaded areas 708 and 716 can be colored differently than the shaded area 716, for example, using a green shade to denote a correct assembly condition and a red shade to denote the faulty assembly condition.

Figure 15:
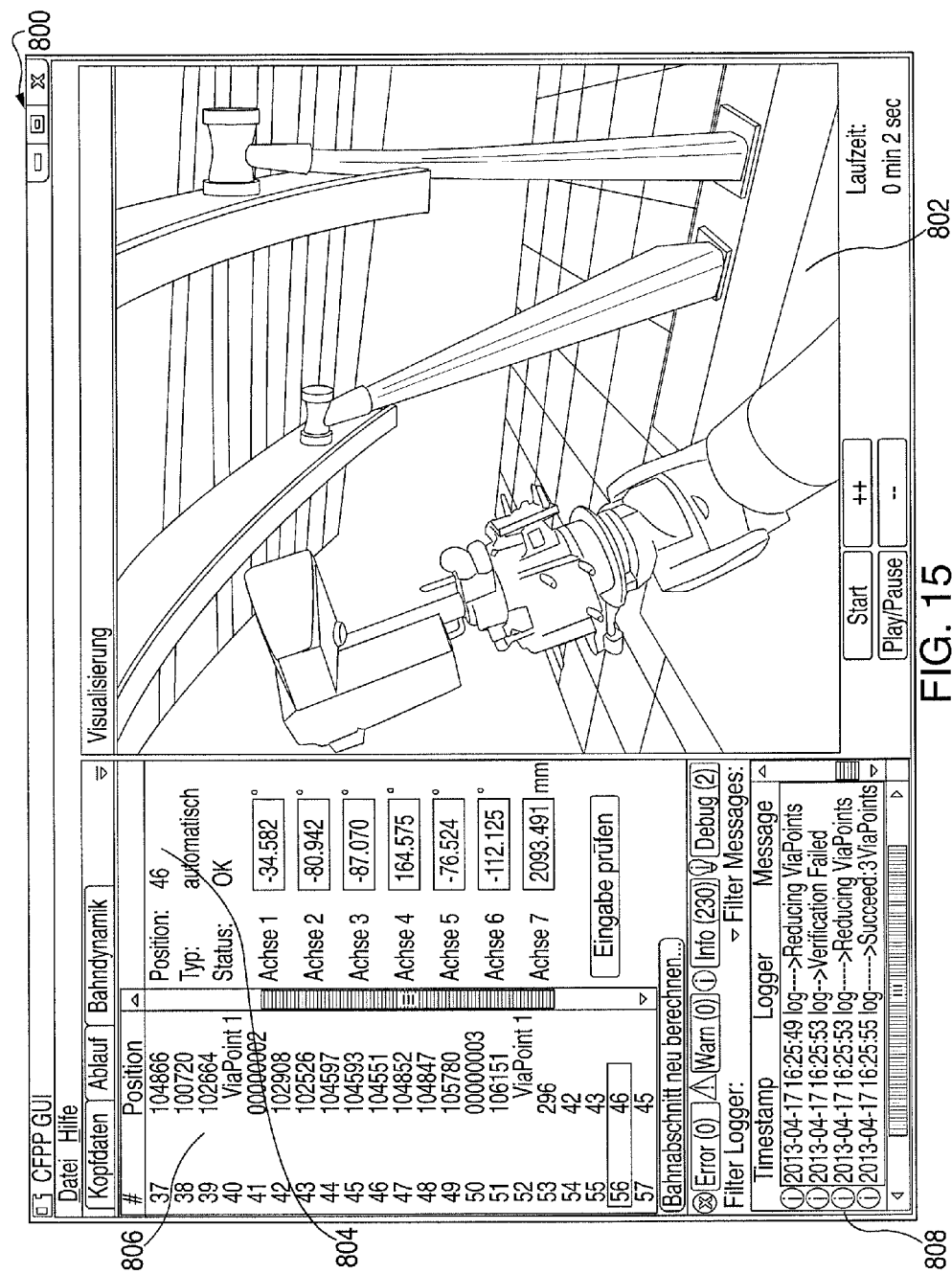
FIG. 15 is a graphical user interface of one embodiment for an inspection system in accordance with the disclosure.

An exemplary graphical user interface (GUI) 800 that can be used by the inspection system 200 to provide information to a user is shown in FIG. 15. The GUI 800 is shown as a Windows® style interface that can be present on a monitor or display connected to or indirectly associated with the controller 236 and configured to exchange information therewith. The GUI 800 includes a visual information field 802 and an analytical information field 804. The visual information field may be a live display that shows, in real time, the position of the sensor array, for example, the sensor assembly 222, in relation with the CAD representation of the object being scanned such that an operator can monitor progress of the inspection in real time. The visual area or field 802 may further include control icons such as "Start" and "Play/Pause," scaling icons, and display time information permitting the user to begin an inspection process, pause and restart the process, change the perspective of view and the like. These controls may be used during an inspection process or can also be active to control a playback of an inspection sequence that has already been completed or model and inspection sequence not yet carried out. In the illustrated embodiment, the GUI 800 is the user interface that automatically generates measurement positions and the robot program, which is then used to control robot operation and to provide information to the controller 236 about the position of the robot at all times such that information acquired from the sensor assembly 222 can be correlated with the particular robot position at which the information was acquired.

The analytical area or field 804 may include and display information about the particular inspection sequence. Accordingly, the inspection station number and position required for its inspection may be listed in tabular form in a table 806. Developer information and other status information on the inspection algorithm may be displayed in a console 808. Particular information about the coordinates of each inspection perspective and location can be displayed for each inspection station in a coordinate table. In the illustrated embodiment, the exact location and orientation required for each inspection station is expressed with respect to a displacement of the robot 202 along each of the seven rotation and translation axes that are possible.

Figure 16:
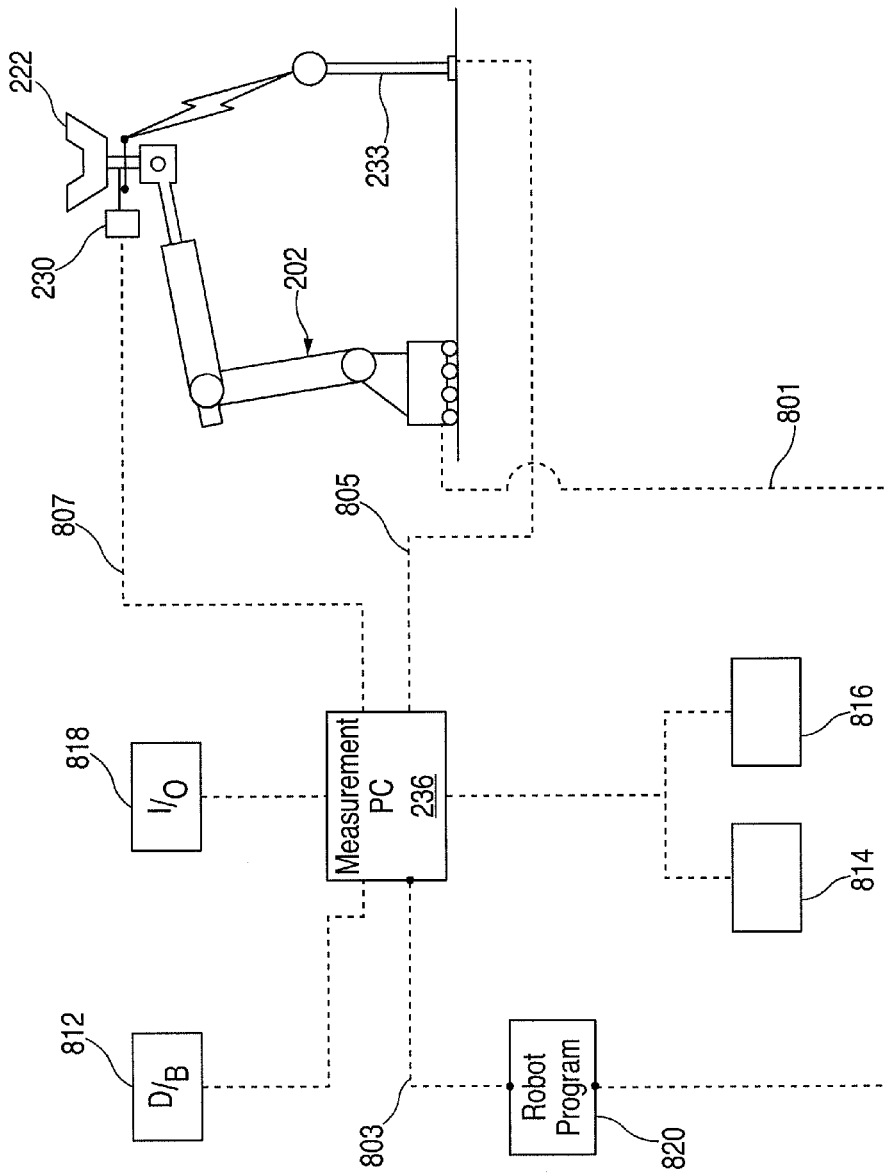
FIG. 16 is a block diagram of an inspection system in accordance with the disclosure.

A block diagram for the inspection system 200 is shown in FIG. 16. In this illustration, features and structures that are the same or similar to corresponding features and structures already described are denoted by the same reference numerals as previously used for simplicity. Accordingly, as shown, in FIG. 16, the controller is connected to a robot-program controller 820, which communicates motion commands to the robot 202 via a robot command communication line 801. The controller or measurement PC 236 provides to the robot-program controller 820 information about the various measurement positions that are to be taken, and the robot-program controller 820 communicates back to the measurement PC 236 the images as acquired as well as a position ID that tells the measurement PC where each picture was taken. The measurement PC 236 and robot-program controller 820 communicate via a measurement-windows communication bus 803, which may be implemented in hardware or software.

During operation, the robot 202 is commanded and moved to bring the sensor assembly 222 to a series of predetermined positions and orientations corresponding to various desired inspection stations. Feedback information about the actual position and orientation of the sensor assembly 222 is provided from the sensor 233 to the controller 236. In one embodiment, positioning of the sensor assembly can be carried out in an open loop arrangement in which commanded positions and feedback are provided by the robot 202, thus making the sensor 233 unnecessary. In the illustrated embodiment, information from the sensor 233 is used to properly position the robot 202 in the desired positions for acquiring images at the inspection stations. To this end, a dedicated controller in the sensor 233 is connected to the controller or measurement PC 236 via a position feedback line 805 to provide the position of the sensor assembly 222 to the controller 236 in real time.

The controller 236 is further connected with the data processing unit 230. The data processing unit 230 receives information from the controller 236 as to the timing of image acquisition as well as the desired two- or three-dimensional image type that should be acquired at each inspection position. The data processing unit 230 can thus acquire the desired images and relay them back to the controller 236 via an image communication line 807 for further processing. As previously discussed, depending on what type of component is to be inspected at each station, the data processing unit 230 can acquire either a two-dimensional image, from which the presence of fasteners, openings and the like can be determined, or a three-dimensional image, from which the shape, location and other aspects of larger components, brackets, clips, fasteners and the like can be determined.

The controller 236 is also connected with a database 812. The database 812 may be installed locally with the controller 236 or may alternatively exist remotely and communicate with the controller via an appropriate protocol. The database 812 is configured to store thereon computer executable instructions that are provided to the controller 236 for execution of an inspection application. Further, the database 812 may be configured to store therein computer readable information indicative of design information for use during an inspection process, for example, information reflective of the CAD information used to compare a real structure with a desired design. To access the CAD information, the controller may further selectively execute a CAD application program that can retrieve and make accessible the CAD information. The database 812 may be further configured to store thereon other information such as the images acquired from the sensor assembly 222, inspection reports generated by the inspection application and other information.

The controller 236 may be further associated with a user input device 814 and a user output device 816. The user input and output devices 814 and 816 may include various known devices such as video displays, keyboards, touch pads, virtual reality input and output devices and the like. Alternatively, or in addition, inputs and outputs from the controller 236 may be provided to remote terminals via an input/output bus 818, for example, via local interface and/or via an HTTP or other internet connection.

It should be appreciated that, in the block diagram shown in FIG. 16, where various electronic controllers are shown, the various controllers may be embodied as a single controller, as the various controllers shown and described, or may alternatively include a different number and types of controller disposed to control various functions and/or features of a machine. For example, a master controller, used to control the overall operation and function of the system, may be cooperatively implemented with a robot, sensor and/or end-effector (sensor array) controller. In the described embodiment, the term "controller" is meant to include one, two, or more controllers that may be associated with the system and that may cooperate in controlling various functions and operations of the system. The functionality of the various controllers, while shown and described conceptually to include various discrete functions for illustrative purposes only, may be implemented in hardware and/or software without regard to the discrete functionality shown and described. Accordingly, various interfaces of the controllers are described relative to components of the inspection system shown in the block diagram of FIG. 16. Such interfaces are not intended to limit the type and number of components that are connected, nor the number of controllers that are described.

Figure 17:
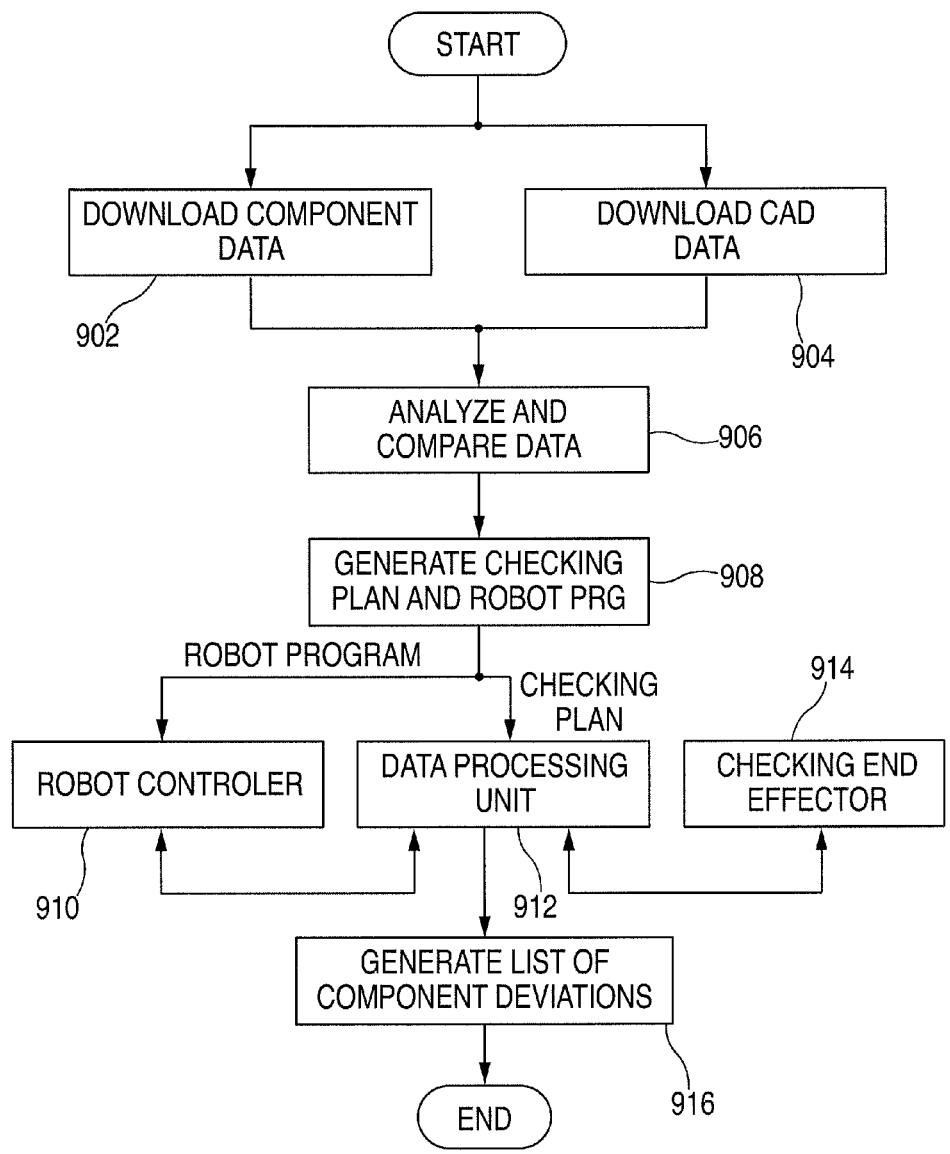
FIG. 17 is a flowchart for an inspection process in accordance with the disclosure.

A flowchart for a method of inspecting the correctness and completeness of an assembly process for a structure is shown in FIG. 17. The described process may advantageously be carried out based on a checking plan that is compared with visual information of the assembly. Both the generation of the checking plan and acquisition of the visual information can be carried out automatically by use of a controller. The controller may interrogate a CAD model of the assembly and generate specific algorithms for identification of specific inspection stations that are relevant to the assembly. Thereafter, the controller may generate a robot path that will carry a sensor array around the assembly such that each inspection station can be visited and information can be acquired therefrom. Using the inspection data from the assembly, the controller can then process the acquired information in view of the design information to generate an inspection report that includes a list of component deviations.

More specifically, at the start of the process, component data is downloaded at 902, and CAD data is downloaded at 904. The downloaded data is analyzed and compared at 906. Based on the data comparison, a checking plan and robot program are generated automatically at 908. In this process stage, the checking plan generated includes identification and cataloging of a plurality of inspection stations based on the number and location of the various components in the assembly. Generation of the robot program, i.e., a program that sets the path of the sensor assembly around the structure to be inspected, considers the inspection stations and also the shape of the structure such that perspectives of the various components are acquired using an appropriate line of sight.

The robot program is provided to a robot controller at 910, and the checking plan is provided to a data processing unit at 912. During an inspection process, a checking end-effector module 914 operates to check the process and reconcile robot and data processing operations to ensure that the all inspection stations are visited and that all information acquired for use by the sensor array carried by the robot is appropriate for the various inspection stations. A list of component deviations or, in general, an inspection report is generated at 916.

Figure 18:
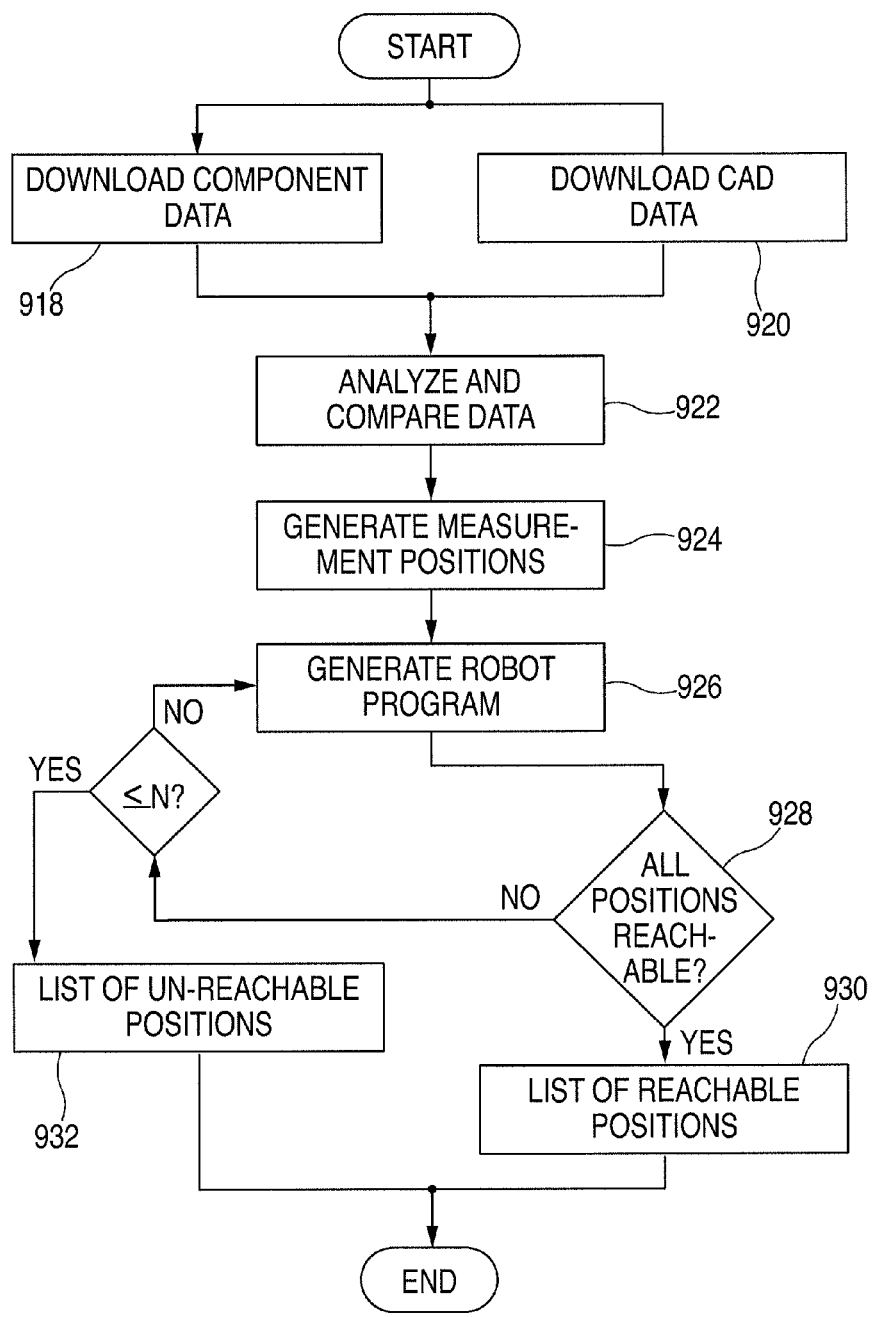
FIG. 18 is a flowchart for one aspect of the inspection process described in FIG. 17.

A flowchart of one aspect of the inspection process in accordance with the disclosure, which specifically relates to the generation of the robot program is shown in FIG. 18. In accordance with the illustrated embodiment, an inspection system software application generates the various inspection stations to be visited by a mobile sensor array, such as the sensor assembly 222 previously described that is carried by a robot. In this embodiment, the accessibility of the various inspection stations is evaluated by the system to ensure that a proper path and orientation by the robot is possible. In the event that the system determines that one or more particular inspection stations cannot be reached, the system modifies the path or trail of the sensor array across the real structure until a trail is selected that renders all inspection stations visible. If, after several trails have been considered by the system, one or more positions are not visible, then the positions are marked or flagged, for example, by an "unreachable" designation, and the inspection proceeds. For such unreachable positions, the system relies on manual inspection by a human operator to complete an inspection report.

Accordingly, as shown in FIG. 18, the system considers visual information acquired by the sensor array at 918, and CAD data acquired at 920, which are compared at 922. On the basis of this comparison, a plurality of measurement positions corresponding to the inspection stations identified are generated at 924, and a desired robot path program is generated at 926 based on the measurement positions. Generation of the robot program at 926 includes checking whether all measurement positions can be achieved, for example, by considering the entire CAD model of the structure and determining whether the path of the robot can clear all structures and provide a line-of-sight view of all inspection stations. For those inspection stations that are determined to be inaccessible, whether because surrounding structures impede motion of the robot or obscure a clear line of sight to the inspection station, the generation at 926 generates a request for alternative measurement positions at 928, which is provided back to process 924. The measurement position generation at 924, the checking of the robot program at 928, and the identification of un-measureable positions at 928 are repeated until either all inspection positions are reachable or until a predetermined "N" number of tries, for example, ten attempts, are made to reach all positions. If all positions are reachable, a confirmation is provided at 930 and the inspection process is deemed ready for initiation. Alternatively, if certain positions remain unreachable after a predetermined number of attempts, those unreachable positions are flagged at 932 for manual inspection and the inspection process is deemed ready for execution and a list of exceptions is generated that can be completed manually.

INDUSTRIAL APPLICABILITY

The disclosed systems and methods have been tested in a real industrial setting and have yielded positive results. One implementation of a system in accordance with the disclosure was aimed at an automated inspection of highly complex structures, which requires no manual or visual confirmation by a human operator. The implementation was conducted on an aircraft structure assembly, where quality can only be ensured if all the components are assembled completely and in the correct position. Owing to the size and complexity of the assemblies and the number of components, highly complex checking has to be performed on aircraft structures, which was previously only possible to carry manually by visual comparison of the aircraft structure with two-dimensional design prints. Despite double-checking procedures, 100% certainty that all faults were detected could not be attained. Typical aircraft structures can include between 10,000 and 30,000 fasteners, each of which must be checked, and an additional 2,500 additional parts such as clips, cleats and fasteners, which are attached to larger structures.

The inspection concept described herein is based on an optical checking head which photographs regions of an aircraft structure, for example, a fuselage shell. The optical checking head can be any known type of optical sensor configured to capture images and three-dimensional (3D) data. A processing unit then compares these images with the associated machine-related 3D model and shows deviations in graphical form and as text information. In the illustrated embodiments, to acquire these images, the system employs a light-section method using structured light projection into the structures being inspected. This methodology has proved to be especially suitable for inspection of fasteners, which are relatively small compared to other components of the assembly. The differently lighted stripes are created by a projector and are recorded by two cameras from different angles of view to provide a three-dimensional perspective. Three-dimensional measurement data can be derived in this fashion by discerning breaks in the lines on the component. This method has proven to be accurate, rapid and precise, and also useful in producing images over a large region in a short time. It should be appreciated, however, that this method represents an exemplary implementation of one possible configuration for an optical sensor acquiring 3D information, and that other configurations can alternatively be used. The data produced can be analyzed and compared with an edge or line extraction from a three-dimensional model that represents the desired design of the structure. The projected light may be filtered, for example, using a red filter, to reduce glare and reflections.

An image comparison of the rivet photos, which can be produced by the stereo cameras, using different filters (brightness, contrast etc.) proved to be advantageous for checking the connecting elements. The difficulty here was that the rivets are only represented in the 3D model by symbols. Therefore, a comparison with the measurement data can take place, but the rivets have to be present as solid bodies and be relatively close to the actual state. A solution for series production can also be implemented. The solution lies in the creation of an algorithm which is generated from the 3D bodies corresponding to rivet symbols, according to the stored characteristics for the connecting elements. These technologies were tested on a demonstrator structure, which was created true to a production structure but that also was made to include assembly errors for purposes of testing. Using the test structure, the checking concept was confirmed within the context of the inspection requirements. Furthermore, the development of algorithms for the automated creation of the check plan and the tools required for producing and analyzing the measurement and comparison data have been further driven forward in the project.

It will be appreciated that the foregoing description provides examples of the disclosed system and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context.

We claim:

1. A method for inspecting assembly of components in an aircraft structure, comprising:
   acquiring a visual representation of at least a portion of the structure that includes a plurality of components therein;
   saving an electronic file of the visual representation on a computer readable medium;
   accessing a three-dimensional design of the structure, the three dimensional design containing information on a proper position of each of the plurality of components within the structure;
   comparing the visual representation with the three-dimensional design using a computer by graphically superimposing an image related to the visual representation with a second image related to the three-dimensional design to determine whether each of the plurality of components encompassed by the visual representation is in a proper position in the structure, as determined by a position of each corresponding component encompassed in the three-dimensional design; and
   generating a feedback indicating a result of the comparison.

2. The method of claim 1, further comprising automatically compiling a list of inspection stations relative to the structure based on the three-dimensional design.

3. The method of claim 2, further comprising compiling a list of inspection stations that are inaccessible for acquisition of the visual representation.

4. The method of claim 2, wherein the acquiring of the visual representation is performed using an optical sensor.

5. The method of claim 4, wherein the optical sensor is a stereoscopic sensor having at least two digital cameras.

6. The method of claim 4, wherein the method further comprises developing an inspection path for a conveyance device configured to selectively position the visual sensor at each inspection station in response to commands provided by the controller.

7. The method of claim 1, wherein comparing the visual representation with the three-dimensional design includes superimposing line-view images of the structure with line-view images rendered from the three-dimensional design, and comparing the superimposed images for agreement of edges appearing therein.

8. A method for automatic inspection of a real aircraft structure against a computer aided design (CAD) model of the real aircraft structure, comprising:
   retrieving CAD data of the model;
   generating a checking plan that includes a plurality of inspection stations;
   generating a robot plan for a robot carrying a sensor array disposed to acquire visual information from the real aircraft structure, the robot plan including a plurality of positions, each position corresponding to a particular inspection station;
   providing the robot plan to a robot controller;
   providing the checking plan to a data processing unit;
   executing the robot plan to obtain visual information from the real aircraft structure;
   comparing the visual information with the CAD data at each inspection station, wherein comparing the visual information with the CAD date includes graphically superimposing the visual information with an image related to the CAD data to determine whether each of a plurality of components that make up the real aircraft structure is in a proper position with respect to corresponding components encompassed in the CAD data of the model; and
   generating an output indicative of component deviations when the comparison of the visual information with the CAD data indicates that a component of the real aircraft structure has at least one of an incorrect position, incorrect shape, or is not present on the real aircraft structure.

9. The method of claim 8, wherein obtaining visual information from the real aircraft structure includes acquiring an electronic image of a portion of the real aircraft structure using a camera that is part of the sensor array.

10. The method of claim 9, wherein the electronic image is a three-dimensional image obtained using a second camera disposed at a distance and at an angle relative to the camera such that the two cameras can together provide a three-dimensional perspective view of the portion of the real aircraft structure.

11. The method of claim 10, further comprising:
    converting visual information provided by the sensor array at each inspection station visited by the sensor array into a line-view image of the real aircraft structure;
    generating a line-view image of the design at the same distance and using the same perspective as a respective inspection station visited by the sensor array that provided the visual information corresponding to that particular inspection station;
    superimposing the line-view image from the sensor array with the line-view image from the design of the real aircraft structure; and
    determining that a fault in an assembly of the real aircraft structure is present when at least one edge in the line-view image of the real aircraft structure deviates from a corresponding edge in the line-view image of the design.

12. The method of claim 11, further comprising portraying a result of the determination that a fault in the assembly has occurred by representing desired and actual location and/or orientation of a component to which the at least one edge belongs in a single image that is provided for viewing by an inspector.

13. The method of claim 8, further comprising tracking at least one of a position, orientation, speed and trajectory of the sensor array relative to the real aircraft structure using an array of tracker targets associated with the sensor array and a positional sensor disposed to sense the array of tracker targets and provide positional information to a controller.

14. The method of claim 8, further comprising compiling a plurality of exceptions containing a subset of the inspection stations that are inaccessible to the sensor array.

15. The method of claim 8, wherein the obtaining of visual information from the real aircraft structure includes acquiring at least one three-dimensional image such that edges and a shape of assembled components in the real aircraft structure can be identified.

16. An inspection system adapted to inspect an aircraft structure, the aircraft structure having a plurality of components therein, the inspection system comprising:

a non-transitory, computer-readable database containing computer readable information therein indicative of a design of the aircraft structure;
an image capturing device configured to capture visual information from the aircraft structure;
a conveyance device configured to selectively carry and position the sensor array relative to the aircraft structure; and
a controller associated with the database, the sensor array, and the conveyance device, the controller disposed to compare the visual information to the information indicative of the design by graphically superimposing an image related to the visual information with a second image related to the three-dimensional design to determine whether each of the plurality of components encompassed by the visual information is in a proper position in the structure, as determined by a position of each corresponding component encompassed in the three-dimensional design.

17. The inspection system of claim 16, wherein the image capturing device includes a camera having a sensor array, and wherein the inspection system further comprises:
a structured light projector configured to provide a lit pattern onto the aircraft structure within a viewing angle of the camera; and
a data processing unit associated with the camera and structured light projector.

18. The inspection system of claim 17, further comprising a second camera disposed at a distance and at an angle relative to the camera such that the two cameras can together provide a three-dimensional perspective view of the objects.

19. The inspection system of claim 16, further comprising:
an array of tracker targets associated with the sensor array; and
a positional sensor disposed to sense the array of tracker targets such that the controller can determine a position, orientation, speed and/or trajectory of the sensor array with respect to the positional sensor based on information provided to the controller by the positional sensor.

20. The inspection system of claim 16, wherein the conveyance device is a robot having multiple axes of motion, wherein the sensor array is connected to a moveable arm of the robot, and wherein the controller is disposed to provide motion commands to the robot that are effective in moving the sensor array to a desired position and orientation relative to the aircraft structure.

21. The inspection system of claim 16, wherein the sensor array is configured to acquire:
three-dimensional images so that edges and a shape of assembled components in the aircraft structure can be identified by the controller; and
two-dimensional images so that a location of edges of the assembled components and openings in the assembled components can be identified by the controller.

22. The inspection system of claim 16, wherein the controller is further disposed to:
convert the visual information provided by the sensor array at each inspection station visited by the sensor array into a line-view image of the aircraft structure;
wherein generating inspection station information based on the design of the aircraft structure includes generating a line-view image of the design at the same distance and using the same perspective as a respective inspection station visited by the sensor array that provided the visual information corresponding to that particular inspection station;
wherein compare the visual information with the inspection station information includes superimposing the line-view image from the sensor array with the line-view image from the design of the aircraft structure; and
determine that a fault in an assembly of the aircraft structure is present when at least one edge in the line-view image of the aircraft structure deviates from a corresponding edge in the line-view image of the design.

* * * * *